Aug. 17, 1926.
H. A. BLYTH
1,596,074
ARTIFICIAL TOOTH
Filed August 24, 1925
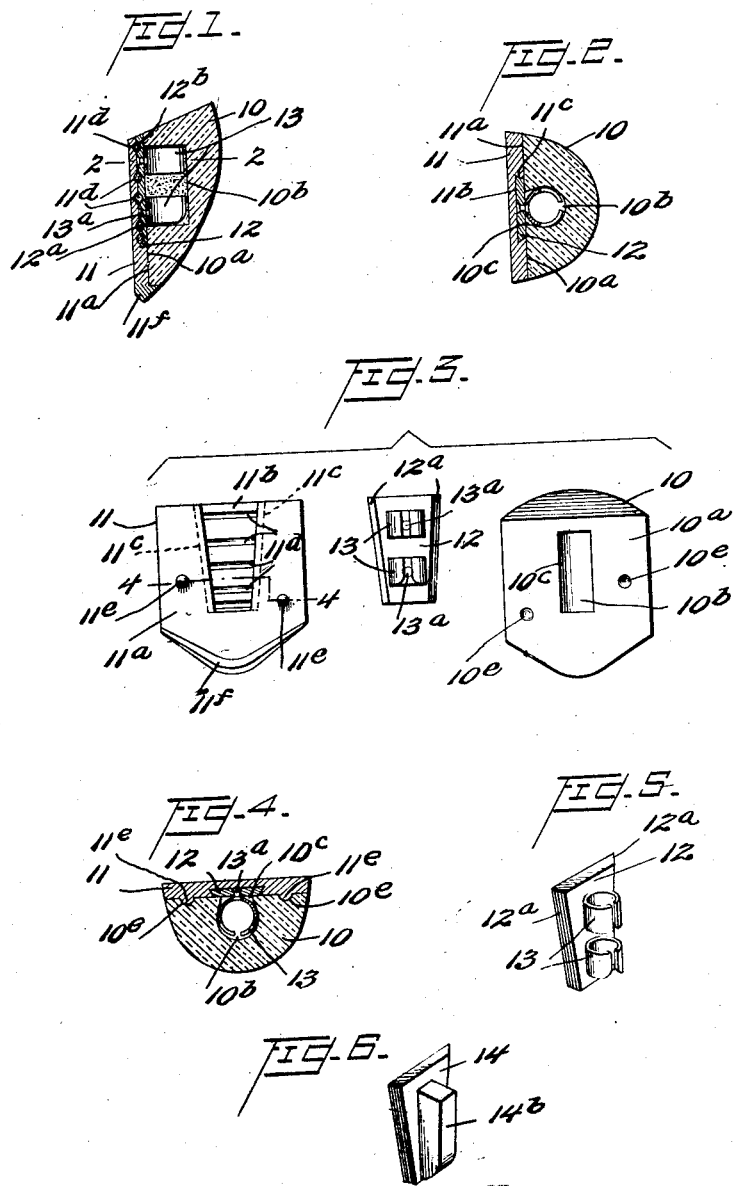

Patented Aug. 17, 1926.

1,596,074

UNITED STATES PATENT OFFICE.

HOMER ATLEE BLYTH, OF ANCHORAGE, TERRITORY OF ALASKA.

ARTIFICIAL TOOTH.

Application filed August 24, 1925. Serial No. 52,101.

This invention relates to artificial teeth and more particularly to means for securing such teeth to a bridge or other dental structure. The object of the invention is to provide a construction by which an artificial tooth can be readily applied to or removed from a backing by pressing the tooth squarely toward the backing, the construction including spring locking means for securing the tooth to the backing. More specifically the invention aims to provide a backing having a depression for detachably receiving a clip having a plurality of spring tongues projecting therefrom in combination with an artificial tooth having a recess which is adapted to receive said tongues so that after the clips are applied to the backing the parts may be secured together by forcing the tooth squarely or perpendicularly toward the face of the backing. Such an arrangement permits the use of a tip on the backing to protect the tooth and also the use of baked root on the tooth. It also facilitates fitting or positioning the artificial teeth as a dummy or temporary clip with the tooth temporarily secured thereto as by wax may be used during the operation of properly fitting the artificial teeth and backing in the position desired. A still further object of the invention is to provide the tooth and backing with cooperating dowel pins and holes which serve to keep these parts in exact position relative to each other. Generally the invention aims to provide an arrangement for facilitating and simplifying the operation of fitting and applying artificial teeth to a bridge or other denture and an arrangement which possesses accuracy and durability. The above and other objects and advantages of the invention will more clearly appear from the following specification and the accompanying drawings forming a part thereof, and in which:

Figure 1 is a longitudinal section of an artificial tooth and backing having my invention applied thereto;

Figure 2 is a section on the line 2—2 of Figure 1;

Figure 3 is a view showing the face of the backing against which the tooth is adapted to lie and the face of the tooth which is adapted to lie against said face of the backing, this view also showing the spring locking device for securing the tooth to the backing;

Figure 4 is a sectional view on the broken line 4—4 indicated at the left in Figure 3, this view showing the various parts illustrated in Figure 3 in their assembled relation;

Figure 5 is a perspective view of the spring locking device illustrated at the middle in Figure 3;

Figure 6 is a perspective view of a dummy piece which if desired may be used as a temporary expedient for holding the tooth to the bridge while fitting the same.

Referring in detail to the drawings by the reference numerals thereon, 10 indicates an artificial tooth which may be made of porcelain or other suitable material, and 11 indicates a backing of any suitable metal to which the tooth is to be secured. The backing is attached in any desired manner to the bridge or other dental structure, not shown. The tooth 10 is provided with a surface $10^a$ which is adapted to lie against a corresponding surface $11^a$ of the backing 11 when the parts are assembled. On the surface $10^a$ of the tooth I provide a recess $10^b$ which extends longitudinally of the tooth but terminates short of ends thereof. The recess $10^b$ is made with a constricted throat $10^c$, that is the recess back of the throat is somewhat enlarged, the purpose of which will later appear. The recess $10^b$ may be said to be enclosed, that is, it is surrounded on all sides by a wall, the only opening into the same being the throat $10^c$.

The face $11^a$ of the backing is provided with a shallow, quadrangular depression $11^b$ extending from the base or gingival edge toward the tip or incisal edge thereof. The depression $11^b$ is preferably wedge-shaped, by which is meant that it is of gradually decreasing width from the gingival edge toward the incisal edge of the bridge. The side walls of this depression $11^b$ are undercut or dovetailed, as shown at $11^c$ in the drawings. The depression $11^b$ is shaped to receive a wedge-shaped clip 12, the base of which is formed of a piece of flat metal provided with inclined side walls $12^a$ adapted to cooperate with the dove-tailed side walls $11^c$ whereby the clip is secured to the backing. I preferably provide the bottom of the depression $11^b$ with transverse grooves or corrugations $11^d$ and the bottom of the clip 12 with similar corrugations $12^b$. These grooves serve to receive cement and thereby firmly hold the clip to the backing when the parts are permanently assembled.

On the face of the clip 12 between the edges thereof I arrange a plurality of spring tongues 13 which may be attached to the body of the clip as by rivets 13ª, although of course the tongues may be soldered or otherwise secured to the clip. Preferably the tongues 13 are opposed or arranged in pairs with their intermediate portions curved laterally away from each other and their other ends spaced apart a slight distance. In fact I prefer to make each pair of spring tongues 13 from a single piece of metal by bending the same into substantially curved form with the free ends thereof spaced apart and the central portion thereof secured to the clip 12.

When the clip 12 with the spring tongues 13 thereon is secured to the backing 11, the tongues will of course project outwardly from the face 11ª of the backing. The spring tongues 13 are shaped and designed to enter the recess 10$^b$ of the tooth. The tongues are so arranged that they will be bent or compressed by the constricted throat 10$^c$ of the tooth when the tooth is faced toward the backing, but will expand in the recess 10$^b$ of the tooth after the same is forced into position on the backing. These tongues therefore constitute spring locking means for securing the tooth to the backing. In the drawings I have illustrated two pairs of spring tongues 13 but it is obvious that more may be employed if desired. It is also obvious that the spring tongues 13 may be made from separate pieces of metal if desired and separately secured to the clip 12, and that the shape of the tongues and the corresponding recess in the tooth may be varied.

With a construction like that described, it will be seen that the tooth can be assembled with the backing by pressing the same perpendicularly toward the backing, that is by forcing the face 10ª of the tooth flatwise or squarely toward the corresponding face 11ª of the backing. By a reverse movement separation of the parts may be effected. This manner of assembling or separating the parts has many advantages as will be apparent to those skilled in the art. To mention some of these, the backing may be supplied with the gold tip as indicated at 11$^f$ which is necessary for protection of the porcelain of the artificial tooth, and yet such tip will not interfere with the operation of applying the tooth to the backing. Likewise the tooth may be supplied with a baked root which will not interfere with such operation. In addition to these advantages teeth can easily be changed on the bridge without removing the bridge, because they can be slipped squarely on or off the bridge and in case a tooth or facing is broken a new one can be easily attached to the bridge.

Another advantage lies in the fact that if a tooth or facing 10 is broken, it is easy to attach a new one to the bridge. In such case, it is generally necessary to destroy the clip 12 and springs 13, but after the old clip and springs are cut out a new clip can be inserted in the depression 11$^b$ if there is sufficient space between the gum and base of the bridge. If not, the clip 12 may be cut in half transversely, and each piece inserted separately, or if this is impossible because of lack of space between the bridge and gum, a short clip corresponding to the narrow half of clip 12, may be inserted in the wider portion of the depression 10$^b$ and slid into the narrow portion of the depression and cemented in place, and a new tooth attached thereto.

To hold the tooth and backing in exact relation to each other, I preferably provide the backing with projections or dowels 11$^e$ which are adapted to fit corresponding recesses 10$^e$ in the tooth when the parts are assembled. This constitutes a very effective arrangement for preventing lateral movement of the tooth in relation to the backing.

It will of course be understood that when the tooth 10 is to be finally and permanently assembled with the backing 11, the recess 10$^b$ is supplied with a suitable cement which is forced into the space between the tongues 13 and into the space around the tongues as the tongues enter the recess, thus very effectively securing the parts together.

In the process of fitting a tooth and backing in the mouth preparatory to forming a bridge or other denture it is desirable to have a means for temporarily securing the tooth to the backing. For this purpose I have provided the temporary clip shown in Fig. 6. This comprises a base portion 14 shaped like the clip 12 and adapted to fit the recess 11$^b$ of the backing and the lug 14$^b$ projecting from the base, which lug is adapted to enter the recess 10$^b$ of the tooth and be held therein by some temporary means as a suitable wax.

After the parts are properly fitted, the tooth, and if desired the temporary clip also, can be removed from the backing while the latter is invested in the usual way and subjected to the usual firing or soldering up to form the bridge. When the bridge is finally formed, the permanent clips 12 and facings 10 are permanently secured thereto as already described.

It is apparent that the specific structure shown and described may be varied in numerous respects and the invention is not to be understood as limited to such specific structure except as required by the appended claims.

Having thus described the invention, what is claimed as new and desired to be secured by Letters Patent is:

1. An artificial tooth fastening comprising a backing having a depression in one face extending from the gingival edge toward the incisal edge thereof, the side walls of said depression being undercut, a clip adapted to fit said depression, and insertable therein from the gingival edge of the backing, said clip having side walls shaped to lie beneath said undercut walls of said depression, an artificial tooth having an enclosed recess in one face thereof, said recess having a constricted throat and an enlarged portion back of said throat, said clip having spring tongues secured thereto and projecting laterally therefrom between the side edges thereof, said tongues being adapted to pass through said throat and to expand in the enlarged portion of said recess when said clip is in position on the backing and said face of the tooth is pressed perpendicularly toward said face on the backing.

2. An artificial tooth fastening comprising a backing having a depression in one face thereof, the side walls of said depression being undercut, a clip adapted to fit said depression, said clip including a substantially flat piece of metal the side edges of which are shaped to lie beneath said undercut walls of said depression, an artificial tooth having a recess on one face thereof provided with a constricted throat and an enlarged portion back of said throat, said clip having spring tongues secured thereto and projecting laterally from the face thereof between said side edges, said tongues being adapted to pass through said throat and to expand in the enlarged portion of said recess when said clip is positioned on the backing and said face of the tooth is pressed toward said face of the backing.

3. An artificial tooth fastening comprising a backing having a wedge-shaped depression on one face thereof extending from the gingival edge toward the incisal edge of the backing, the side walls of said depression being undercut, a wedge-shaped clip adapted to fit and be secured in said depression, the sides of said clip being shaped to lie beneath the undercut sides of said depression, an artificial tooth having an enclosed recess on one face thereof, said recess having a constricted throat and an enlarged portion back of said throat, said clip having opposed spring tongues secured thereto and projecting laterally therefrom between said sides, said tongues being adapted to be pressed together in entering said throat and to expand in the enlarged portion of said recess when said face of the tooth is pressed toward said face of the backing.

4. A method of fitting and permanently fastening an artificial tooth to a bridge or the like, comprising the following steps; forming a depression in the face of a backing, inserting and temporarily securing in said depression a temporary clip having a rib projecting therefrom, forming a tooth with a recess in one face thereof, applying said tooth to said backing with said rib extending into and temporarily held in said recess, positioning said assembled backing, temporary clip and tooth to form the proper set up for the bridge desired, removing the tooth from the backing, soldering up the backing to form the desired bridge or denture, removing said temporary clip, inserting and permanently securing in said depression a permanent clip having spring tongues thereon, and permanently attaching the tooth to said backing by inserting and cementing said spring tongues in said recess of the tooth.

5. A construction of the kind described in claim 1, including dowels projecting outwardly from the face of the backing, and recesses formed on the face of said tooth for receiving said dowels when the tooth is applied to the backing.

6. A construction of the kind described comprising a backing having a recess provided with depressions in the bottom thereof, a clip adapted to fit in said recess, said clip also having depressions in the bottom thereof, said depressions serving to receive cement to secure the parts together, said clip having two opposed spring tongues secured to the same, an artificial tooth having a recess in one face thereof adapted to receive and hold said spring tongues, whereby said tooth is held to the backing.

In testimony whereof I hereunto affix my signature.

HOMER ATLEE BLYTH.